(12) United States Patent
Prodi et al.

(10) Patent No.: US 7,035,729 B2
(45) Date of Patent: Apr. 25, 2006

(54) METHOD FOR CONTROLLING THE SPEED OF A TORQUE-CONTROLLED INTERNAL COMBUSTION ENGINE

(75) Inventors: Giovanni Prodi, Bologna (IT); Claudio Gambelli, Florence (IT); Savino Lupo, Bologna (IT)

(73) Assignee: Magneti Marelli Powertrain S.p.A., (IT)

( * ) Notice: Subject to any disclaimer, the term of this patent is extended or adjusted under 35 U.S.C. 154(b) by 48 days.

(21) Appl. No.: 10/822,100

(22) Filed: Apr. 10, 2004

(65) Prior Publication Data

US 2004/0267436 A1    Dec. 30, 2004

(30) Foreign Application Priority Data

Apr. 11, 2003    (IT) ............................ BO2003A0213

(51) Int. Cl.
*G06G 7/70*    (2006.01)

(52) U.S. Cl. .............. 701/110; 123/339.19; 123/339.21

(58) Field of Classification Search ................ 701/110; 123/339.1, 339.11, 406.23, 339.19, 339.2, 123/339.21

See application file for complete search history.

(56) References Cited

U.S. PATENT DOCUMENTS

| | | | |
|---|---|---|---|
| 5,495,835 A | 3/1996 | Ueda | 123/339.11 |
| 5,765,527 A | 6/1998 | Lehner et al. | 123/339.1 |
| 6,000,376 A | 12/1999 | Hess et al. | 123/333 |
| 6,131,546 A | 10/2000 | Vogt et al. | 123/406.23 |
| 6,133,643 A | 10/2000 | Lukich et al. | 290/40 A |
| 6,716,137 B1* | 4/2004 | Kolmanovsky et al. | 477/115 |
| 6,735,938 B1* | 5/2004 | Surnilla | 60/274 |

FOREIGN PATENT DOCUMENTS

| | | |
|---|---|---|
| FR | 2790516 | 9/2000 |
| WO | WO01/61171 | 8/2001 |

OTHER PUBLICATIONS

European Search Report for EP 04 10 1481 (Jun. 30, 2004).

* cited by examiner

*Primary Examiner*—Henry C. Yuen
*Assistant Examiner*—Johnny H. Hoang
(74) *Attorney, Agent, or Firm*—Howrey LLP

(57)    ABSTRACT

A method for controlling the speed of a torque-controlled internal combustion engine in which the generation of the drive torque is regulated by actuators which are controlled from a control value of the instantaneous torque and by a control value of the predicted torque, the method providing for the calculation of an objective value of the speed, the calculation of an objective value of the torque reserve, the calculation of an objective value of the potential torque on the basis of the objective value of the torque reserve, the generation of the control value of the instantaneous torque by means of a first feedback control loop which uses as input the objective value of the speed, and the generation of the control value of the predicted torque by means of a second feedback control loop which uses as input the objective value of the potential torque.

15 Claims, 2 Drawing Sheets

METHOD FOR CONTROLLING THE SPEED OF A TORQUE-CONTROLLED INTERNAL COMBUSTION ENGINE

CROSS REFERENCE TO RELATED APPLICATIONS

The present application claims priority to Italian Patent Application Ser. No. BO2003A 000213 filed Apr. 11, 2003, the contents of which are incorporated herein by reference.

FIELD OF THE INVENTION

The present invention relates to a method for controlling the speed of a torque-controlled internal combustion engine.

The present invention can be used in a particularly advantageous manner for controlling the idling speed of a torque-controlled internal combustion engine supplied with petrol by indirect injection, to which the following description will explicitly refer without going into unnecessary detail.

DESCRIPTION OF RELATED ART

A torque-controlled internal combustion engine comprises an electronic control unit which performs the function of coordinating torque requests and generates as output a control signal for the control of the actuators which regulate the torque generation; this control signal is formed by a first value which indicates the control value of the instantaneous torque and is used to control the actuators which have a rapid effect on drive torque generation (the ignition advance in an internal combustion engine supplied with petrol by indirect injection) and by a second value which indicates the control value of the predicted torque and is used to control the actuators which have a slow effect on drive torque generation (the position of the butterfly valve in an internal combustion engine supplied with petrol by indirect injection).

The torque request coordinator receives requests for torque from a series of controllers, including the idling speed controller; at present, the idling speed controllers apply a feedback control method using only an objective of speed of rotation of the drive shaft or, as an alternative, a feedback control method using an objective of speed of rotation of the drive shaft and an objective of pressure in the intake manifold. The corresponding commands are obtained by means of complex processing of the errors that occur with respect to the above-mentioned objectives and the idling speed controller obtains the desired values of the instantaneous torque and the predicted torque to be supplied to the torque request coordinator.

It has been observed that current idling speed controllers do not manage to cope efficiently with the torque disturbances which may occur on the drive shaft, typically as a result of the sudden increase in the torque absorbed by the alternator following the actuation of devices supplied by the electrical plant of the vehicle. When a torque disturbance occurs, the speed of rotation of the drive shaft tends in particular to perform marked oscillations about the desired value; marked oscillations with respect to the speed of rotation of the drive shaft are disturbing for the driver and make it necessary to keep the desired value of the idling speed relatively high to prevent the engine from stalling as a result of these oscillations; as an alternative, it is necessary to impose a relatively high torque reserve value to try to contain the amplitude of the oscillations. However, both keeping the desired value of the idling speed relatively high and imposing a relatively high torque reserve value entail an increase in engine consumption at the idling speed.

U.S. Pat. No. 5,765,527A1 discloses a method and an arrangement for controlling the torque of an internal combustion engine wherein the engine is operated at an operating point at least at idle wherein a pregiven torque reserve is present via the ignition angle for a more rapid reaction to load changes.

FR2790516A1 disclose a method of controlling an IC engine which includes drawing regulating parameter instructions taking foreseeable and unforeseeable loads into account. The instructions for regulating parameters, whether slow or fast are drawn up, should the situation arise, with regulating loops controlling the regulating parameters for ensuring the functioning of the engine; the development of the instructions are drawn up and taken into account the real load values and projected values determined in their entirety by enquiring foreseeable load and unforeseeable load.

SUMMARY OF THE INVENTION

The object of the present invention is to provide a method for controlling the idling speed of a torque-controlled internal combustion engine which is free from the above-described drawbacks and is in particular easy and economic to embody.

The present invention therefore relates to a method for controlling the idling speed of a torque-controlled internal combustion engine as described in detail herein.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

DETAILED DESCRIPTION OF THE INVENTION

Figure 1:
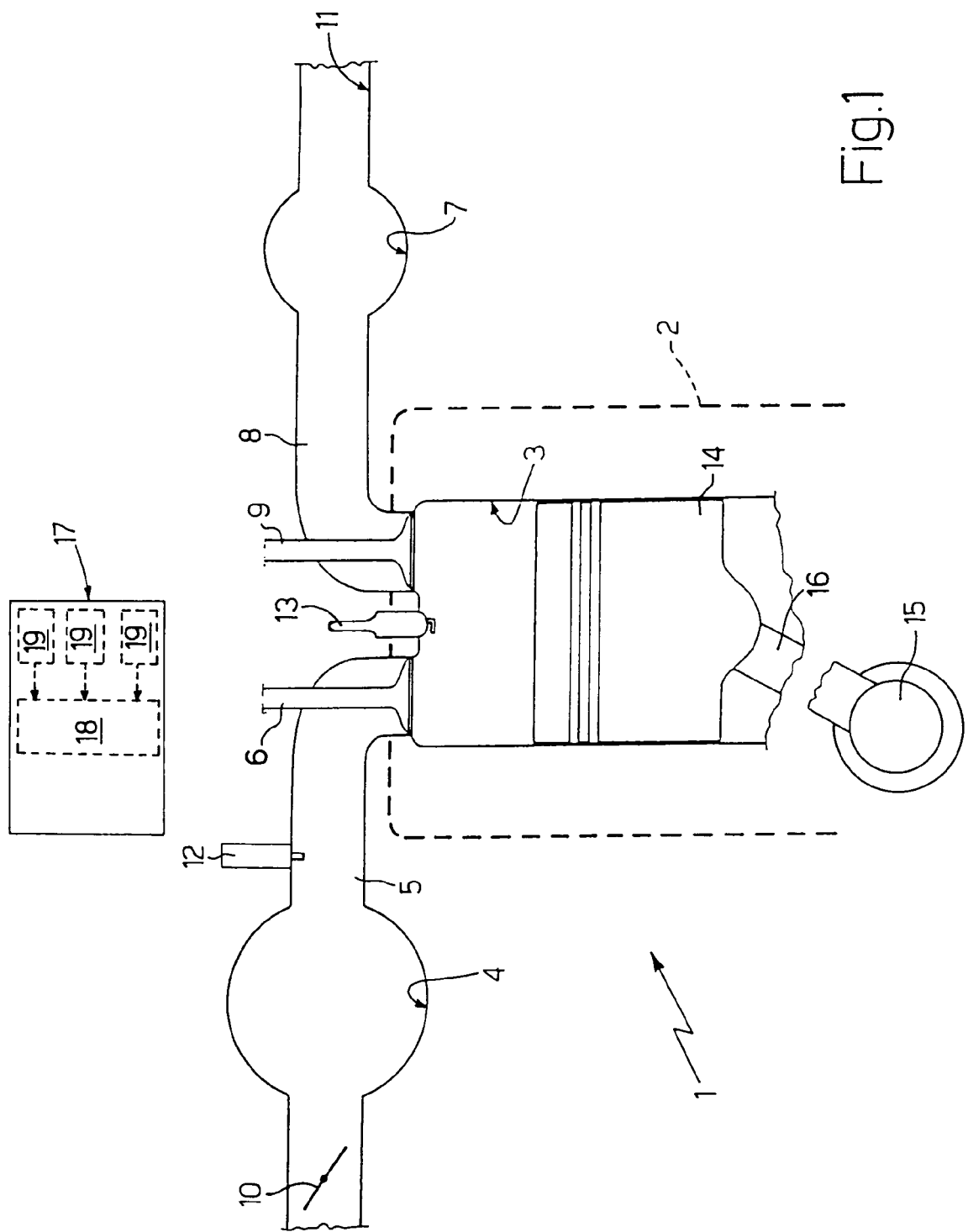
FIG. 1 is a diagrammatic view of an internal combustion engine with indirect petrol injection provided with an electronic control unit which applies the speed control method of the present invention.

In FIG. 1, an internal combustion engine of a road vehicle (not shown) is shown overall by 1; the engine 1 is torque-controlled and is provided with a block 2 in which four cylinders 3 (only one of which is shown in FIG. 1) are provided, each of which is connected to an intake manifold 4 by means of a respective intake duct 5 regulated by at least one respective intake valve 6 and to an exhaust manifold 7 by means of a respective exhaust duct 8 regulated by at least one respective exhaust valve 9. The intake manifold 4 receives fresh air (i.e. air from the external atmosphere) via a butterfly valve 10 which can be adjusted between a closed position and position of maximum opening; an exhaust device 11 provided with one or a plurality of catalysts (not shown in detail) leads from the exhaust manifold 7 in order to emit the gases generated by the combustion in the cylinders 3 into the atmosphere.

Four injectors 12 (one for each cylinder 3) are coupled to the respective intake ducts 5 in order cyclically to inject petrol into these intake ducts 5; four spark plugs 13 (one for each cylinder 3) are also coupled to the respective cylinders 3 in order cyclically to cause the ignition of the mixture contained in these cylinders 3.

Each cylinder 3 is coupled to a respective piston 14 which is adapted to slide in a linear manner along the cylinder 3 and is mechanically connected to a common drive shaft 15 by a relative connecting rod 16; in operation, the thrust exerted by the pistons 14 generates a drive torque on the drive shaft 15 which is of a pulse type, has a value C which may vary over time and causes the drive shaft 15 to rotate at an angular speed n (typically measured as a number of revolutions in a unit of time) which may vary over time.

The engine 1 further comprises an electronic control unit 17 which acts as a coordinator 18 of the torque requests and receives the torque requests from a series of control systems 19 (also implemented in the electronic control unit 17) and subsequently generates a control signal for the actuation of the actuators which regulate the drive torque generation; this control signal is formed by a first value which indicates the control value $C_{ist}$ of the instantaneous torque and is used to control the actuators which have a rapid effect on the drive torque generation and by a second value which indicates the control value $C_{pre}$ of the predicted torque and is used to control the actuators which have a slow effect on the drive torque generation. The control value $C_{ist}$ of the instantaneous torque is in particular used in the engine 1 to control the ignition advance, i.e. to vary the instant of ignition of the spark plugs 13, while the control value $C_{pre}$ of the predicted torque is used to control the position of the butterfly valve 10. It will be appreciated that the torque request coordinator 18 limits the control value $C_{ist}$ of the instantaneous torque between a respective minimum value and a respective maximum value depending on an estimated value $Cp_{sti}$ of the current potential torque, which indicates the maximum value C of drive torque that can be obtained by the engine 1 (at stationary speed, the estimated value $Cp_{sti}$ of the potential torque coincides with the value of the predicted torque); this arrangement helps to ensure a minimum quality threshold for the combustion in the cylinders 3 preventing the occurrence of any problems of misfire or detonation (knock).

The various control systems 19 include the control system 19 for the idling speed whose primary objective is to prevent the speed, i.e. the speed of rotation of the drive shaft 15, from moving out of the area of a desired value called the idling value; the action of the idling speed control system 19 is in particular used predominantly when the drive shaft 15 is mechanically unconnected from the wheels (not shown) of the vehicle and the driver is not exerting any pressure on the accelerator pedal (not shown) of the vehicle.

Figure 2:
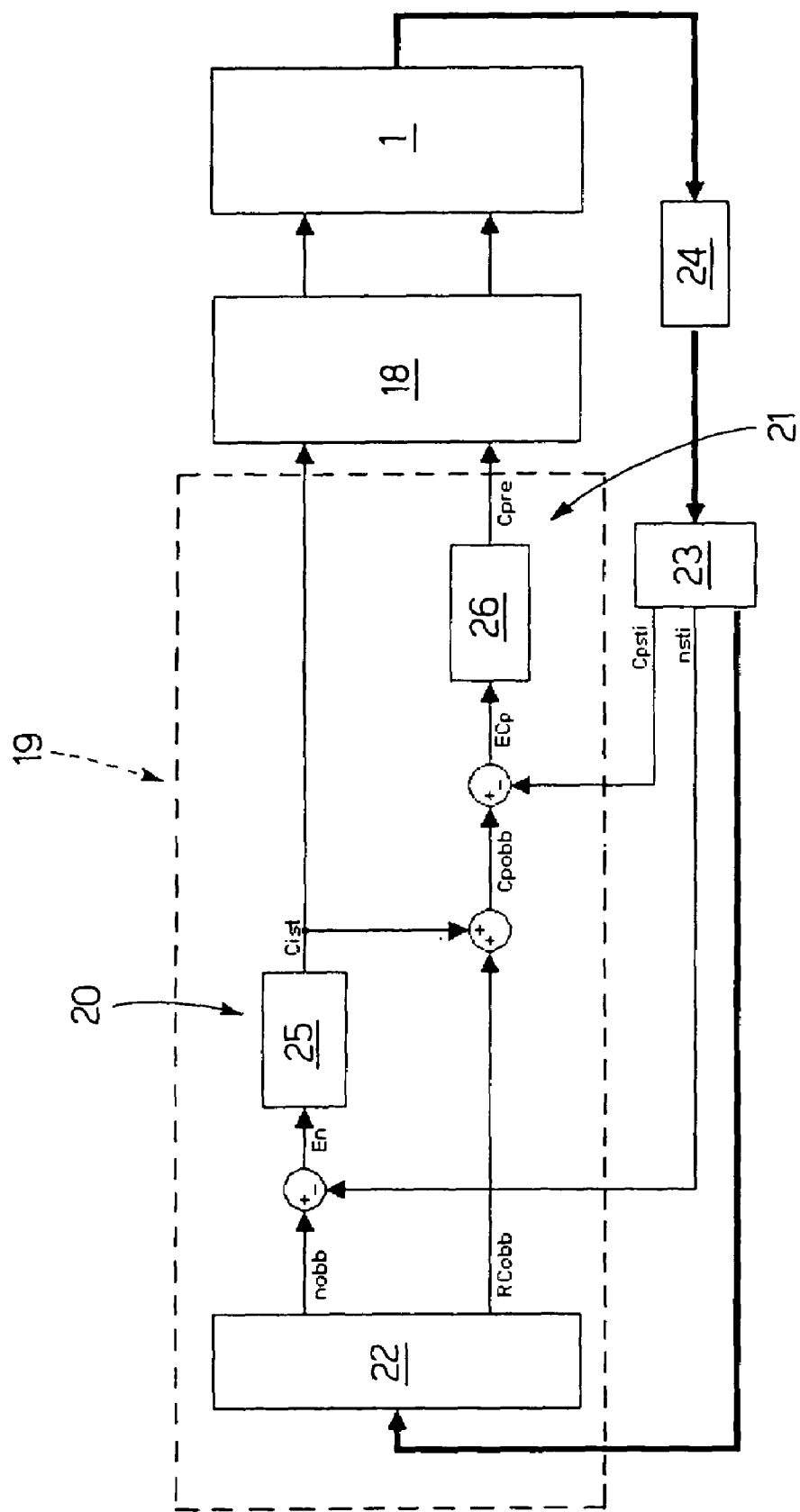
FIG. 2 is a block diagram of a control line used by the electronic control unit of FIG. 1.

As shown in FIG. 2, the idling speed control system 19 applies a feedback control loop 20 which is adapted to generate the control value $C_{ist}$ of the instantaneous torque and a feedback control loop 21 which is adapted to generate the control value $C_{pre}$ of the predicted torque. In other words, the control loop 20 controlling the generation of the instantaneous torque is adapted directly to govern the value n of the speed of the engine 1 and the control loop 21 controlling the generation of the predicted torque is adapted to ensure that the control loop 20 has sufficient margins to be able to react to any torque disturbances which may occur with respect to the drive shaft 15.

A calculation block 22 generates an objective value $n_{obb}$ of the speed and an objective value $RC_{obb}$ of the torque reserve; the torque reserve is the difference between the estimated value $Cp_{sti}$ of the potential torque and a value of the torque implemented which represents the value of the torque generated at the drive shaft 15 and substantially coincides with the instantaneous torque control value $C_{ist}$. The calculation block 22 calculates the objective value $n_{obb}$ of the speed and the objective value $RC_{obb}$ of the torque reserve as a function of the point of operation of the engine 1, as a function of the thermal state of the engine 1, and as a function of the internal and external requests supplied to the engine 1; for this purpose, the calculation block 22 is connected to a measurement and estimation block 23 which is adapted to measure and/or estimate the trend over time of the value of a series of physical magnitudes of the engine 1 using a plurality of sensors 24.

The control loop 20 calculates an error En of the speed by subtracting a measured value $n_{sti}$ of the current speed from the objective value $n_{obb}$ of the speed and calculates the control value $C_{ist}$ of the instantaneous torque from the speed error En, using a controller 25 of dynamic type; the control loop 21 calculates an objective value $Cp_{obb}$ of the potential torque by adding the objective value $RC_{obb}$ of the torque reserve to the control value $C_{ist}$ of the instantaneous torque generated by the first control loop 20, calculates an error ECp of the potential torque by subtracting an estimated value $Cp_{sti}$ of the current potential torque from the objective value $Cp_{obb}$ of the potential torque, and calculates the control value $C_{pre}$ of the predicted torque from the error ECp of the potential torque, using a controller 26 of dynamic type.

In a different embodiment which is not shown, it is possible for the control loop 21 to calculate an error ERC of the torque reserve by subtracting an estimated value $RC_{sti}$ of the current torque reserve from the objective value $RC_{obb}$ of the torque reserve, and to calculate the control value $C_{pre}$ of the predicted torque from the error ERC of the torque reserve, using the controller 26 of dynamic type; the estimated value $RC_{sti}$ of the current torque reserve is calculated by subtracting the control value $C_{ist}$ of the instantaneous torque from the estimated value $Cp_{sti}$ of the potential torque. It will be appreciated that this embodiment is algebraically equivalent to the solution illustrated as the error ERC of the torque reserve is identical to the error ECp of the potential torque.

The measured value $n_{sti}$ of the current speed and the estimated value $Cp_{sti}$ of the current potential torque are supplied by the measurement and estimation block 23; the measured value $n_{sti}$ of the current speed could in particular be measured directly by a respective sensor 24 coupled to the drive shaft 15.

The control value $C_{ist}$ of the instantaneous torque and the control value $C_{pre}$ of the predicted torque are supplied by the idling speed control system 19 to the torque request coordinator 18 which controls the value C of the drive torque generated by the engine 1.

According to a preferred embodiment, the gains of the controllers 25 and 26 are preferably calculated as a function of the point of operation of the engine 1 and/or the gear engaged in a gear change associated with the engine 1. Moreover, the control loop 20 works on the basis of the evolution of the angular position of the drive shaft 15, i.e. the variation of the magnitudes involved by the first control loop 21 is expressed as a function of the angular position of the drive shaft 15; the control loop 21 works on the basis of the evolution of time, i.e. the variation of the magnitudes involved by the second control loop 21 is expressed as a function of time. This choice is due to the fact that the control loop 20 generates the control value $C_{ist}$ of the instantaneous torque which is used to steer the ignition advance that is implemented with angular frequency, i.e. as a function of the angular position of the drive shaft 15, while the control loop 21 generates the control value $C_{pre}$ of the predicted torque which is used to steer the position of the butterfly valve 10 which is actuated with a time cadence, i.e. as a function of time.

The objective value $RC_{obb}$ of the torque reserve may be kept constant enough in any operating condition; it is preferable, however, to vary the objective value $RC_{obb}$ of the torque reserve as a function of the occurrence of torque disturbances with respect to the drive shaft 15 and in particular to reduce the objective value $RC_{obb}$ of the torque reserve in a manner inversely proportional to the intensity of the torque disturbances with respect to the drive shaft 15. This method makes it possible to reduce the consumption of the engine 1 (the higher the value RC of the torque reserve, the higher consumption is) without limiting the promptness of the response of the idling speed control system 19 to the torque disturbances with respect to the drive shaft 15; once a torque disturbance is present on the drive shaft 15, the objective value $RC_{obb}$ of the torque reserve no longer has to take account of the possibility of this torque disturbance occurring. As a limit case, once all the foreseeable torque disturbances are present, the objective value $RC_{obb}$ of the torque reserve could be substantially cancelled out. According to a preferred embodiment, the controller 25 of the control loop 20 is able to estimate the torque disturbances acting on the drive shaft 15.

Various experimental tests have shown that the method for controlling the idling speed of the internal combustion engine 1 described above has an excellent response to torque disturbances acting on the drive shaft 15, is particularly stable, and makes it possible to keep fuel consumption at very low levels.

As a result of the many advantages of the method for controlling the idling speed of the internal combustion engine 1 described above, this control method may also be profitably used to control any speed of the engine and not necessarily the idling speed.

It will also be appreciated that the control method described above may be used with any type of torque-controlled internal combustion engine such as, for instance, an internal combustion engine supplied with petrol by direct injection, or an internal combustion engine supplied with diesel by direct injection; obviously, if the type of internal combustion engine varies, the components used to regulate the generation of the drive torque may also vary.

What is claimed is:

1. A method for controlling the speed of a torque-controlled internal combustion engine; the method comprising the steps of:
    regulating the generation of the drive torque to a drive shaft by actuators which are controlled from a control value of the instantaneous torque and by a control value of the predicted torque; calculating the objective value of the speed;
    generating the control value of the instantaneous torque by means of a first feedback control loop which uses as input the objective value of the speed;
    calculating an objective value of the torque reserve;
    calculating an objective value of the potential torque by adding the control value of the instantaneous torque generated by the first control loop to the objective value of the torque reserve; and
    generating the control value of the predicted torque is generated of a second feedback control loop which uses the objective value of the potential torque as input.

2. The method of claim 1, wherein the first feedback loop calculates an error of the speed by subtracting an estimated value of the current speed from the objective value of the speed and calculates the control value of the instantaneous torque from the error of the speed.

3. The method of claim 1, wherein the second control loop calculates an error of the potential torque by subtracting an estimated value of the current potential torque from the objective value of the potential torque and calculates the control value of the predicted torque from the error of the potential torque.

4. The method of claim 1, wherein the first control loop works on the basis of the evolution of the angular position of the drive shaft, i.e. the variation of the magnitudes involved by the first control loop is expressed as a function of the angular position of the drive shaft.

5. The method of claim 1, wherein the second control loop works on the basis of the evolution of time, i.e. the variation of the magnitudes involved by the second control loop is expressed as a function of time.

6. The method of claim 1, wherein the objective value of the torque reserve is kept constant.

7. The method of claim 1, wherein the objective value of the torque reserve is varied as a function of the occurrence of torque disturbances on the drive shaft.

8. The method of claim 7, wherein the objective value of the torque reserve is reduced in the event of torque disturbances on the drive shaft.

9. The method of claim 8, wherein the objective value of the torque reserve is reduced in a manner inversely proportional to the intensity of the torque disturbances acting on the drive shaft.

10. The method of claim 7, wherein a controller of the first feedback control loop is able to estimate the torque disturbances acting on the drive shaft 15.

11. The method of claim 1, wherein the objective value of the speed and the objective value of the torque reserve are calculated as a function of the point of operation of the engine and as a function of the external requests reaching the engine.

12. The method of claim 1, wherein the gains of controllers of the first feedback control loop and the second feedback control loop are calculated on the basis of the point of operation of the engine.

13. The method of claim 12, wherein the gains of controllers of the first feedback control loop and the second feedback control loop are calculated on the basis of the point of operation of the engine and the gear engaged in a gear change associated with the engine.

14. The method of claim 1, wherein the first control loop controlling the generation of the instantaneous torque is adapted directly to govern the value of the speed of the engine and the second control loop controlling the generation of the predicted torque is adapted to ensure that the first control loop has sufficient margins to be able to react to the torque disturbances which may occur on the drive shaft.

15. The method of claim 1, wherein the objective value of the speed and the objective value of the torque reserve are also calculated as a function of the thermal state of the engine.

* * * * *